March 4, 1969 W. A. LOFSTRAND ET AL 3,431,432

TIMER

Filed Nov. 12, 1965 Sheet 1 of 3

INVENTORS
WARREN AXEL LOFSTRAND
JURGEN BRUGMANN
BY

ATTORNEYS

March 4, 1969   W. A. LOFSTRAND ET AL   3,431,432
TIMER

Filed Nov. 12, 1965   Sheet 2 of 2

INVENTORS
WARREN AXEL LOFSTRAND
JURGEN BRUGMANN
BY
*Donald P. Elliott*
ATTORNEY

United States Patent Office 3,431,432
Patented Mar. 4, 1969

3,431,432
TIMER
Warren A. Lofstrand, Weathersfield, and Jurgen Brugmann, Waterbury, Conn., assignors to Consolidated Electronics Industries Corp., Waterbury, Conn., a corporation of Delaware
Filed Nov. 12, 1965, Ser. No. 507,411
U.S. Cl. 307—141                 5 Claims
Int. Cl. H01h 7/00, 7/08, 43/00

ABSTRACT OF THE DISCLOSURE

A push-to-actuate timer comprising a motor, a switch, and a cam that is free to move axially under pressure into and out of actuating engagement with the switch. When moved into controlling engagement, the switch turns on the motor, which is connected to rotate the cam to a position in which a region on the cam surface permits the switch to return to its non-actuated condition, thereby turning off the motor. The time required for the motor thus to turn itself off is the pre-set timing interval, but earlier removal of pressure on the cam also turns off the motor and terminates the timing operation.

---

This invention relates to timers, and more particularly to interval timers of the adjustable synchronous motor driven type, using a cam operated switch to give the desired time interval. Such timers may be employed to control the operation of a wide variety of machines, particular examples of which may be liquid dispensers and the like.

The principal object of this invention is to provide an interval timer, the duration of operation of which can be changed, to enable, for example, the dispensing of a constant amount of cream when there are variables such as the viscosity of the liquid in the machine, or the diameter of the nozzle employed.

Another object of the invention is to provide an interval timer, the operation of which may be terminated either after a predetermined timing interval, or independently thereof, as desired.

Still another object of the invention is to provide a timer which will reset to its start position when there is an interruption of its operating cycle.

A further object of the invention is to provide an interval timer, in combination with an electric motor, which automatically de-energizes the motor at the completion of the timing interval.

For a better understanding of the present invention, together with other and further objects thereof, reference is had to the following description taken in connection with the accompanying drawings and its scope will be pointed out in the appended claims.

Referring to the drawings.

Figure 1:
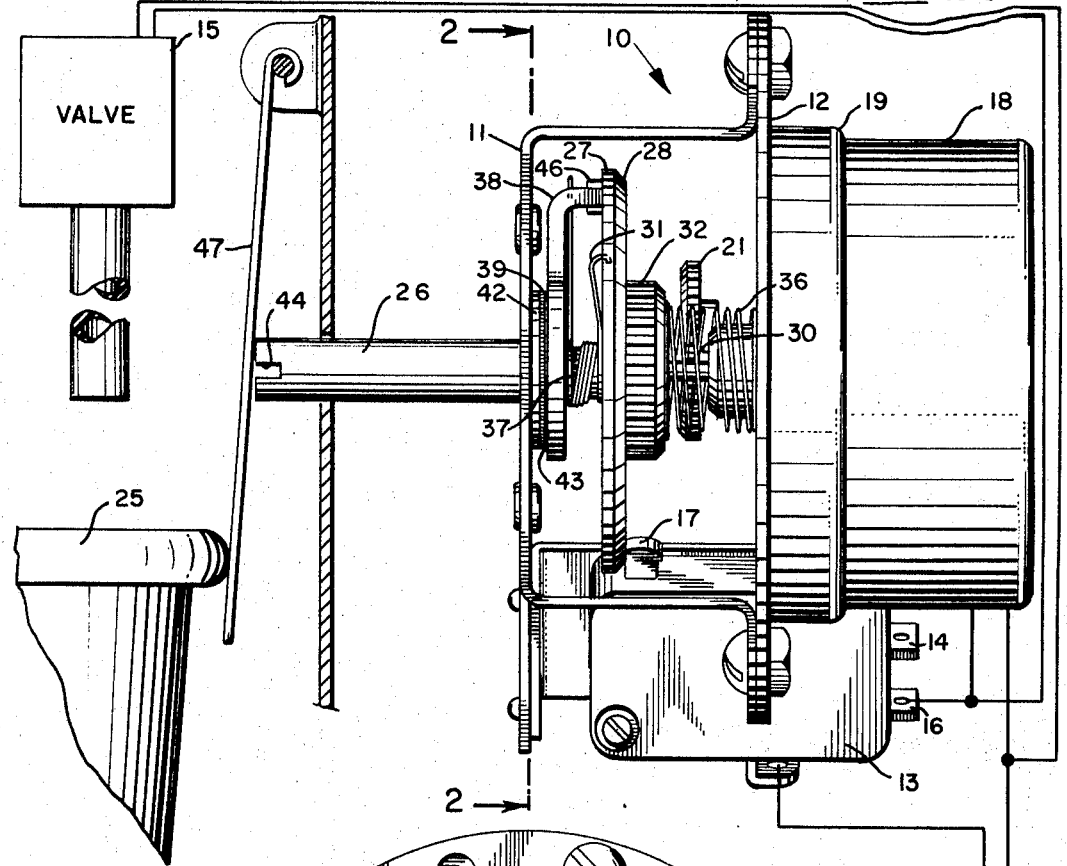
FIG. 1 is a side elevational view, partly in section, of a portion of the interval timer control mechanism, showing the timer in the unactuated position, and in combination with a cream dispenser.

Referring initially to FIG. 1, the timer mechanism housing 10 comprises a circular face plate 12 bolted to a U-shaped frame 11. Mounted peripherally on one side of the housing is a micro-switch 13 which includes a protruding control member or button 17, extending into the central area of the housing, and contacts 14 and 16 which lead to an electrical control device or valve 15.

Figure 4:
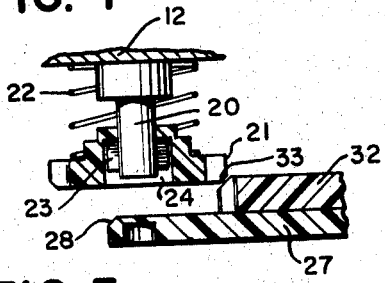
FIG. 4 is a sectional view taken along the line 4—4 of FIG. 2 of a portion of the timer mechanism in its unactuated position.
Figure 5:
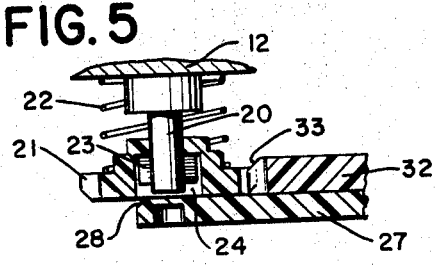
FIG. 5 is a view similar to FIG. 4 with the timer mechanism in its actuated position.

A synchronous motor 18 is connected in series with the switch 13, and is mounted on the face plate 12, along with its gear train 19. As shown in FIGS. 4 and 5, the motor has a shaft 20 extending through the face plate 12 and into the center space of the housing. Rotatably mounted on the motor shaft 20 is a secondary gear 21, which is free to move axially along the length of the shaft 20. A spring 22 is employed to urge the secondary gear 21 toward the free end of the shaft, and a transverse member 23, which may also be a key or a spline, is adapted to fit into a slot 24 in the gear to establish a driving connection between the gear and the motor shaft.

A pressure cam shaft 26 extends through an opening in the U-shaped frame 11 of the housing mechanism. Rotatably connected to the enclosed end of the cam shaft 26 is a cam wheel 27 with a beveled edge 28. The cam shaft 26 is axially movable and is adapted to carry the cam wheel 27, and particularly its beveled edge, into contact with the control button 17 of the switch 13, to close the same and thereby to actuate the motor.

Figure 6:
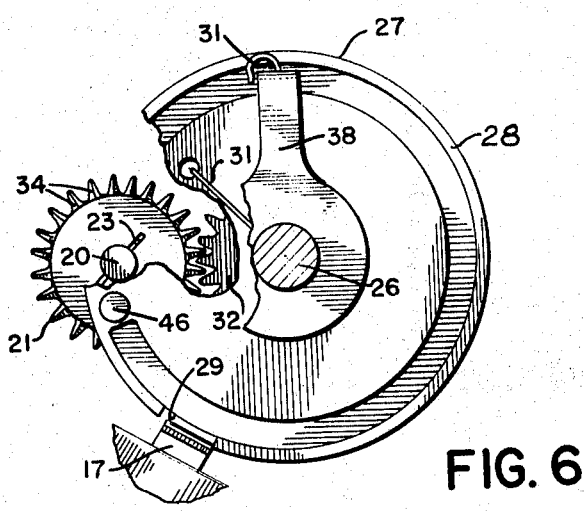
FIG. 6 is a sectional view taken along the line 6—6 of FIG. 3.

Located in the periphery of the cam wheel is a notch 29 at a size sufficient to create an opening that can fit over the control button 17 of the switch, as illustrated in FIG. 6. Since the control button is resiliently biased outwardly, or in a direction tending to keep the switch open, the switch opens and the motor is de-energized when the notch 29 reaches the button. It should be noted that when the wheel 27 has been moved inwardly to energize the switch 13, a stop 30 is provided to prevent the wheel from going beyond the button 17.

Figure 3:
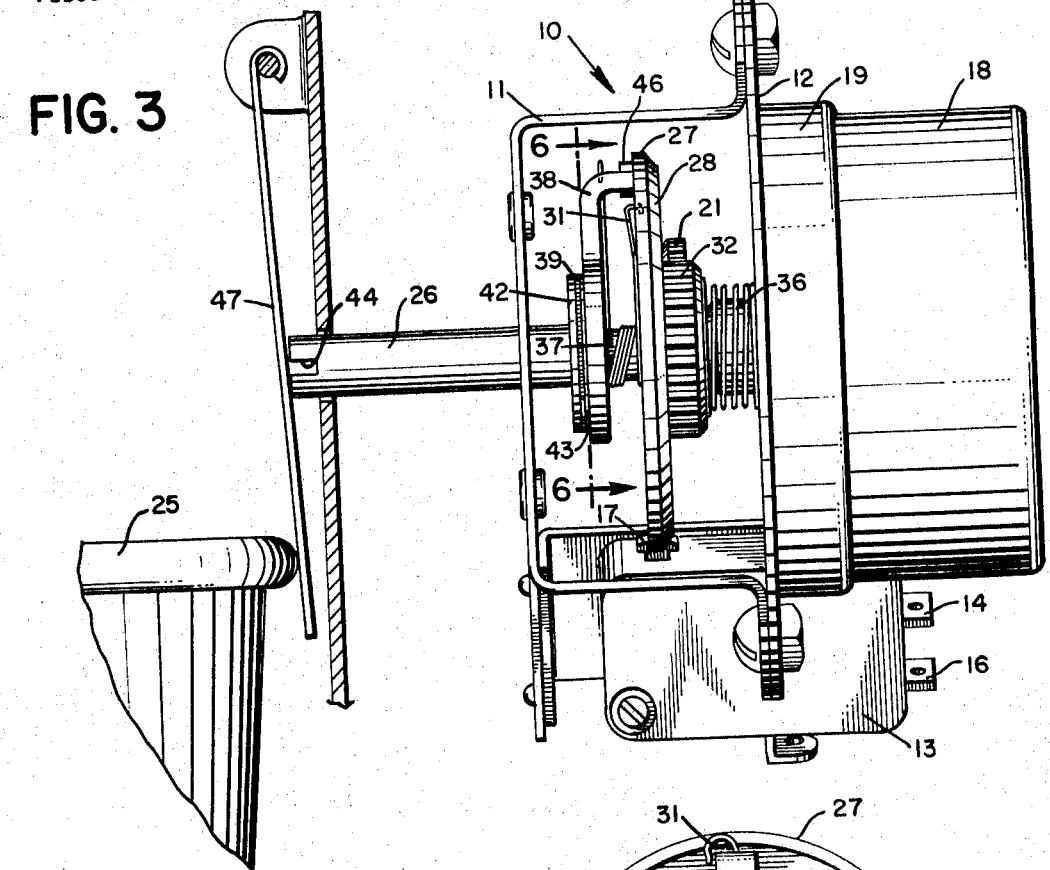
FIG. 3 is a side elevational view similar to FIG. 1, of the interval timer control mechanism in its actuated position.

A torsion spring 31, seen in FIGS. 1 and 3, is mounted on the cam shaft 26 and in engagement with the cam wheel 27 to impart a rotational torque on the cam wheel. Affixed to the cam wheel 27 is a main gear 32, it will be observed that when the cam shaft is moved axially in one direction, carrying the beveled edge 28 of the cam wheel into engagement with the control button 17 of the switch, to close the same and actuate the motor, the main gear 32 and the secondary gear 21 of the motor shaft 20 mesh together. To enhance this meshing process, the facing edge of the teeth of each of the gears may be beveled, as illustrated at 33 and 34, in FIGS. 4 and 6, respectively.

The tendency of the motor drive is to rotate the cam wheel 27 against the tension in the torsion spring 31. Another spring 36 is employed to bias the cam shaft 26 away from its timer actuating position. When the actuating pressure on the cam shaft is released, the spring 36 pushes the cam wheel 27, and its gear 32, out of contact, respectively, with the control button 17, and the secondary gear 21. Upon such disengagement, the torsion spring 31 forces the cam wheel to rotate back to its predetermined starting position, thus re-setting the timer.

Referring to FIGS. 1 and 3, it is seen that a series of splines 37 is circumferentially arranged on the cam shaft 26 between the cam wheel 27 and the face plate 11 of the timer mechanism housing. A locating stop arm 38 is pressed into a rigid engagement with the splines. Also fitting over the cam shaft in close proximity to the stop arm 38 is a U-shaped member 39, adapted to engage a fixed pin 41 which is located in the frame 11 of the housing, and which extends inwardly toward the center of the timing mechanism. A friction coupling comprising a washer 42 against a shoulder of the shaft 26 on one side of the U-shaped member 39 and a friction washer 43 on the other is employed to prevent the inadvertent movement of the locating stop arm with respect to the U-shaped member, once the former has been set to the desired position.

Figure 2:
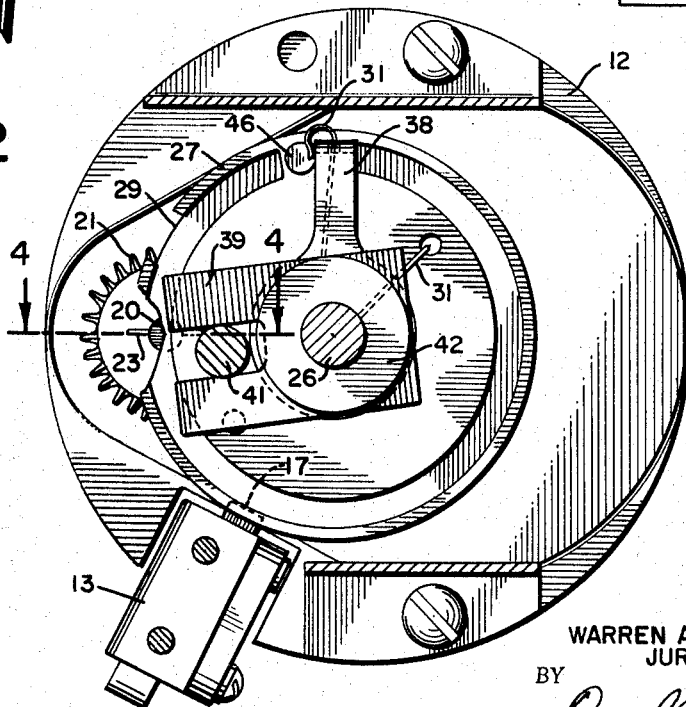
FIG. 2 is a sectional view taken along the line 2—2 of FIG. 1.

A slot 44, suitable for use with, for example, a screwdriver, is located at the exterior end of the cam shaft, for use in rotating the same. It is to be noted that the locating stop arm 38 will rotate with the rotation of the cam shaft. However, because of the fixed pin 41 in the housing, the cam shaft and locating stop arm will not rotate a full 360°. A stop pin 46, FIGS. 1 and 2, is located on the cam wheel 27 and cooperates with the locating stop arm 38, to determine the starting position of the cam wheel. The duration of operation of the timer is determined by the initial position of the notch 29 with respect to the control button 17 of the switch. The maximum duration of operation is such that the notch on the cam wheel will rotate nearly 360° before reaching a position opposite and forming an opening over the control button of the switch thereby allowing the switch to open. With respect to the minimum duration of operation the cam wheel 27 can be set so that it will rotate only few degrees before the notch moves into position to receive the button 17 allowing the switch to open.

In operation, the timing duration is set by rotating the cam shaft 26, with its locating stop arm 38, to the desired position. The rotational torque applied to the cam wheel 27 by the torsion spring 31, forces the pin stop 46 of the cam wheel, and consequently the duration of operation of the timer, will be determined by the adjusted position of the locating stop arm. The timer is started by pressure, applied through a cup 25 for example, to a pressure plate 47 and thus to the cam shaft 26, resulting in axial movement of the cam shaft. The cam wheel 27 is carried with the cam shaft to engage and press in the control button 17 of the switch 13, thus closing the circuit and actuating the motor 18. In addition, the main gear 32 is carried toward the secondary gear 21 to mesh therewith and to be driven thereby with the result that the cam wheel 27 is forced to rotate against the torque created by the torsion spring 31. The cam wheel continues to rotate until the notch 29 along the periphery of the cam wheel comes into position opposite the control button 17 of the switch. When this happens the control button 17 can no longer remain depressed, the switch is opened, the motor is de-energized, and the control valve 15 is closed. Thus the timer completes its cycle and opens the switch despite the fact that the cam shaft may be held in the depressed position for a period of time longer than the operation cycle.

The timer will continue to run for the duration of its time setting as long as the cam shaft is held in the "pushed in" position. Upon release of the cam shaft, it springs back into its initial position with the result that the main and secondary gears disengage, thus allowing the cam wheel to rotate back to its predetermined starting position. If the cam shaft is released before the completion of the predetermined timing duration, the cam wheel will move out of engagement with the control button of the switch, thus opening the switch and deactivating the motor and closing the valve 15. This makes it possible to dispense as little liquid as may be desired but not inadvertently to dispense more than a predetermined quantity. Of course, if the user withdraws the cup 25 to permit the wheel 27 to be rotated back into its starting position, a second quantity of liquid may be dispensed.

While the present invention has been illustrated and described in terms of a single embodiment, it will be obvious to those skilled in the art that modifications may be made therein without departing from the true scope of the invention as defined by the following claims.

What is claimed is:

1. The combination of an electric motor and timer, said timer comprising: a switch to actuate said motor, said switch having first and second positions and including a control member normally resiliently biased in one direction to cause said switch to be in position whereby no current flows; a cam shaft with a cam rotatably attached thereto; a first spring axially biasing said shaft in one direction, said cam shaft being axially movable in the opposite direction under pressure to carry said cam into contact with said control member of said switch thereby to actuate said switch and energize said motor, said cam being provided with a notch located in the periphery thereof having edges encompassing said control member of said switch thereby to allow the opening of said switch; a main gear non-rotatably connected to said cam thereby to drive the same; a secondary gear connected to said motor to be driven thereby and to mesh with said main gear when said cam is moved axially into engagement with said control member thereby to drive the same and to drive said cam until said notch moves into position opposite said control member of said switch enabling said control member to move to its unactuated position; and a second spring connected to said cam and to support means therefor to rotate said cam to its initial position when the pressure on said cam shaft is released.

2. The timer of claim 1 comprising, in addition: a positionable locating stop is non-rotatable engagement with said cam shaft; and a second stop attached to said cam and cooperating with said locating stop to determine the extent of rotation of said cam before said notch in said cam is positioned opposite said control member in said switch.

3. The timer of claim 2 comprising, in addition: a fixed guide; a U-shaped bracket fitting over said cam shaft and engaging said fixed guide; a friction coupling between said U-shaped bracket and said cam shaft to enable said cam shaft with said positionable locating stop to be rotated with respect to said fixed pin, thereby to determine said initial starting position of said cam.

4. An interval timer, said timer comprising: a synchronous electric motor, including a motor shaft; a cam operated micro-switch to actuate said motor, said switch being connected in series between said synchronous motor and an electric current supply, and in addition, having contacts for connection to an electrical control device and a control member to control said contacts; an axially movable cam shaft with a cam rotatably attached thereto, the edge of said cam facing said control member being beveled to slide onto said control member and actuate said switch; a main gear non-rotatably connected to said cam thereby to drive the same; a secondary gear slidably arranged on said motor shaft, to be driven thereby; a first spring axially biasing said secondary gear in one direction along said motor shaft to enable said secondary gear to mesh with said main gear thereby to drive said main gear and said cam, said secondary gear being axially movable in the opposite direction under pressure of accidental non-alignment of said main gear with said secondary gear; a second spring connected to said cam and to support means therefor to urge said cam into a rest position; and a third spring axially biasing said cam away from said switch; said switch causing said motor to run.

5. The timer of claim 4 in which the facing edges of both said main gear and said secondary gear are beveled to facilitate their meshing.

References Cited

UNITED STATES PATENTS

| | | |
|---|---|---|
| 2,872,075 | 2/1959 | Steiner. |
| 3,150,241 | 9/1964 | Goodhouse et al. |
| 3,151,489 | 10/1964 | Bowen. |
| 3,162,733 | 12/1964 | Gardes et al. |

ROBERT K. SCHAEFER, *Primary Examiner.*

T. B. JOIKE, *Assistant Examiner.*

U.S. Cl. X.R.

137—624.17, 624.22; 318—466; 200—38